US010054836B2

(12) United States Patent
Cammenga et al.

(10) Patent No.: US 10,054,836 B2
(45) Date of Patent: Aug. 21, 2018

(54) ELECTRO-OPTIC ASSEMBLY

(71) Applicant: Gentex Corporation, Zeeland, MI (US)

(72) Inventors: David J. Cammenga, Zeeland, MI (US); Christopher M. Derry, Allegan, MI (US); Bradley A. Bosma, Hudsonville, MI (US); George A. Neuman, Holland, MI (US); Mario F. Saenger Nayver, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/947,578

(22) Filed: Nov. 20, 2015

(65) Prior Publication Data

US 2016/0147126 A1     May 26, 2016

Related U.S. Application Data

(60) Provisional application No. 62/180,379, filed on Jun. 16, 2015, provisional application No. 62/082,962, filed on Nov. 21, 2014.

(51) Int. Cl.
*G02F 1/157* (2006.01)
*G02B 27/01* (2006.01)
*G02B 1/11* (2015.01)

(52) U.S. Cl.
CPC ......... *G02F 1/157* (2013.01); *G02B 27/0101* (2013.01); *G02B 1/11* (2013.01); *G02B 2027/0118* (2013.01)

(58) Field of Classification Search
CPC .......... G02F 1/157; G02F 1/161; G02B 1/11; G02B 27/0101; G02B 2027/0118
(Continued)

(56) References Cited

U.S. PATENT DOCUMENTS

2002/0196518 A1    12/2002  Xu et al.
2005/0200934 A1     9/2005  Callahan et al.
(Continued)

FOREIGN PATENT DOCUMENTS

EP       2131227 A1      9/2009
JP     H07140308 A      6/1995
(Continued)

OTHER PUBLICATIONS

International Searching Authority, Notification of Transmittal of the International Search Report and the Written Opinion of the International Searching Authority, or the Declaration, Apr. 4, 2016, 11 pages, Federal Institute of Industrial Property, Russia.

*Primary Examiner* — Jack Dinh
(74) *Attorney, Agent, or Firm* — Price Heneveld LLP; Bradley D. Johnson

(57) ABSTRACT

An electro-optic assembly for use in a vehicle having a windshield is provided and includes a first arcuate substrate having a first surface with an anti-reflective coating and a second surface. A second arcuate substrate includes a third surface and a fourth surface with an anti-reflective coating. The first and second substrates are positioned such that the second and third surfaces are at least 0.1 mm apart. A seal is disposed between the first and second substrates and located substantially about a periphery of the electro-optic assembly. An electro-optic medium is positioned in a cavity defined by the first substrate, the second substrate, and the seal, the electro-optic medium including a refractive index greater than 1.2. The second surface is configured to receive and reflect incident light projected from a projector, thereby displaying information that appears to be displayed forward of the windshield.

6 Claims, 6 Drawing Sheets

(58) Field of Classification Search
USPC .......................................................... 359/275
See application file for complete search history.

(56) References Cited

U.S. PATENT DOCUMENTS

2006/0066508 A1    3/2006    Walck et al.
2008/0218434 A1    9/2008    Kelly et al.

FOREIGN PATENT DOCUMENTS

JP        2005112352 A      4/2005
KR        1020110127470     11/2011

ELECTRO-OPTIC ASSEMBLY

CROSS REFERENCE TO RELATED APPLICATIONS

This application claims priority under 35 U.S.C. § 119(e) to U.S. Provisional Patent Application Nos. 62/180,379, filed on Jun. 16, 2015, entitled "ELECTRO-OPTIC ASSEMBLY, and 62/082,962, filed on Nov. 21, 2014, entitled "ELECTRO-OPTIC ASSEMBLY," which are incorporated herein by reference in their entirety.

FIELD OF THE DISCLOSURE

The present disclosure generally relates to an electro-optic assembly, and more particularly, an electro-optic assembly configured as a vehicle heads up display.

SUMMARY OF THE DISCLOSURE

According to one aspect of the present disclosure, an electro-optic assembly for use in a vehicle having a windshield is provided and includes a first arcuate substrate having a first surface with an anti-reflective coating and a second surface. A second arcuate substrate includes a third surface and a fourth surface with an anti-reflective coating. The first and second substrates are positioned such that the second and third surfaces are at least 0.1 mm apart. A seal is disposed between the first and second substrates and located substantially about a periphery of the electro-optic assembly. An electro-optic medium is positioned in a cavity defined by the first substrate, the second substrate, and the seal, the electro-optic medium including a refractive index greater than 1.2. The second surface is configured to receive and reflect incident light projected from a projector, thereby displaying information that appears to be displayed forward of the windshield.

According to another aspect of the present disclosure, a heads up display assembly includes an electro-optic assembly. A first arcuate substrate includes a first surface and a second surface. One of the first surface and the second surface includes a transmissive reflective coating. A second arcuate substrate includes a third surface and a fourth surface. The fourth surface includes an anti-reflective coating. An electro-optic medium is positioned in a cavity defined between the first substrate and the second substrate. The second surface is configured to reflect incident light projected from a projector into a forward viewing area of a vehicle driver. A spectral filter is disposed about a peripheral edge of the electro-optic assembly.

According to yet another aspect of the present disclosure, a heads up display system of a vehicle is provided and includes a projector at least partially concealed in a dash of said vehicle and an electro-optic assembly. A first substrate includes a first surface and a second surface. The first surface is coated with an anti-reflective coating, including less than 1% reflectance, and the second surface coated with a reflective coating. A second substrate is positioned adjacent the first substrate and includes a third surface and a fourth surface. The third surface is coated with a light transmissive and conductive coating, and the fourth surface is coated with an anti-reflective coating. An electro-optic medium is positioned in a cavity defined between the first substrate and the second substrate. A light transmittance of the electro-optic assembly is controlled by varying a potential between the coatings on the second and third surfaces. The electro-optic assembly is configured to reflect incident light projected from the projector in order to display vehicle-related information. Incident light is projected from the projector at an angle of 25 degrees or less relative to the first surface proximate a top portion of the electro-optic assembly.

These and other features, advantages, and objects of the present disclosure will be further understood and appreciated by those skilled in the art by reference to the following specification, claims, and appended drawings.

DETAILED DESCRIPTION

Figure 1A:
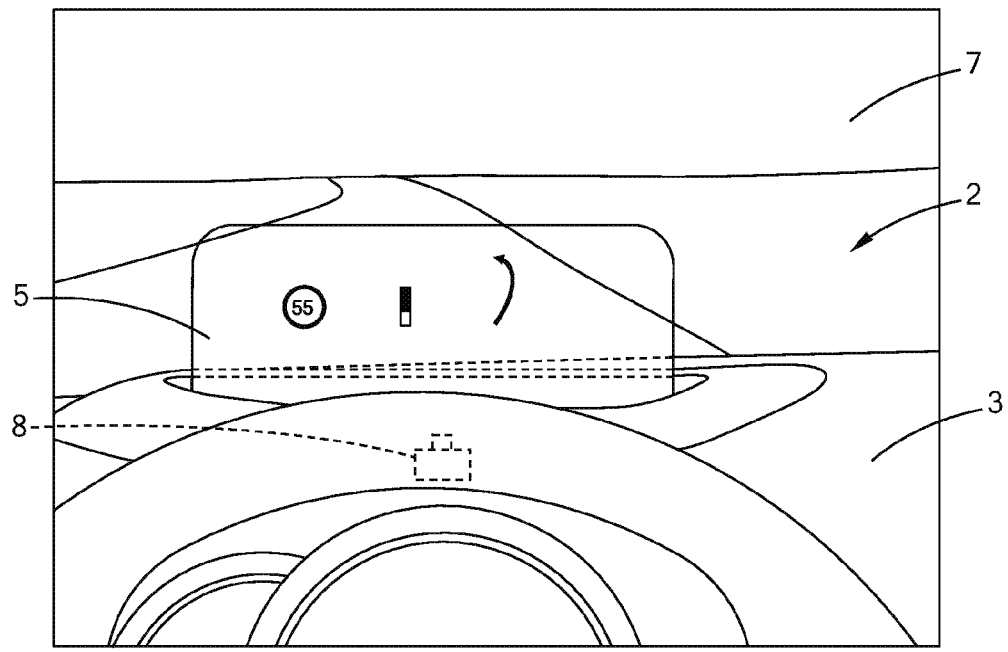
FIG. 1A is a front elevational view of one embodiment of a heads up display assembly of the present disclosure.

The present illustrated embodiments reside primarily in combinations of method steps and apparatus components related to an electro-optic assembly, and more particularly, a heads up display system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the electro-optic assembly as oriented in FIG. 1A. Unless stated otherwise, the term "front" shall refer to the surface of the element closer to an intended viewer of an electro-optic assembly, and the term "rear" shall refer to the surface of the element further from the intended viewer of the electro-optic assembly. However, it is to be understood that the electro-optic assembly may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Heads up displays (HUDs) are used in many automotive and aerospace applications to present information to a driver or pilot while allowing simultaneous forward vision. In many cases, the HUD is located on the front windscreen of the vehicle. Information is projected onto the windscreen for the vehicle operator's use. The aerodynamic designs of many vehicles have made using the windscreen in the HUD design more difficult when the angle of the windscreen is low. In regards to HUD systems, the image projected onto the HUD needs to be bright enough to see in any condition. This is particularly challenging when the lighting outside the vehicle is bright. For instance, the contrast between the light from the HUD and the lighting behind the HUD can be low on a bright sunny day. While a brighter, more intense lighting source improves the contrast, increasing the HUD brightness alone may not be a reasonable solution in very bright conditions since higher intensity lighting generally draws more current, generates unwanted heat, and adds cost to the system. Additionally, a HUD that is bright enough to provide reasonable contrast in very bright daylight conditions will be too bright in other conditions. Although controls may be used to deal with variations in brightness, the specific background is ever changing in a moving vehicle, and depends in part on the position of the driver's eyes.

Figure 1B:
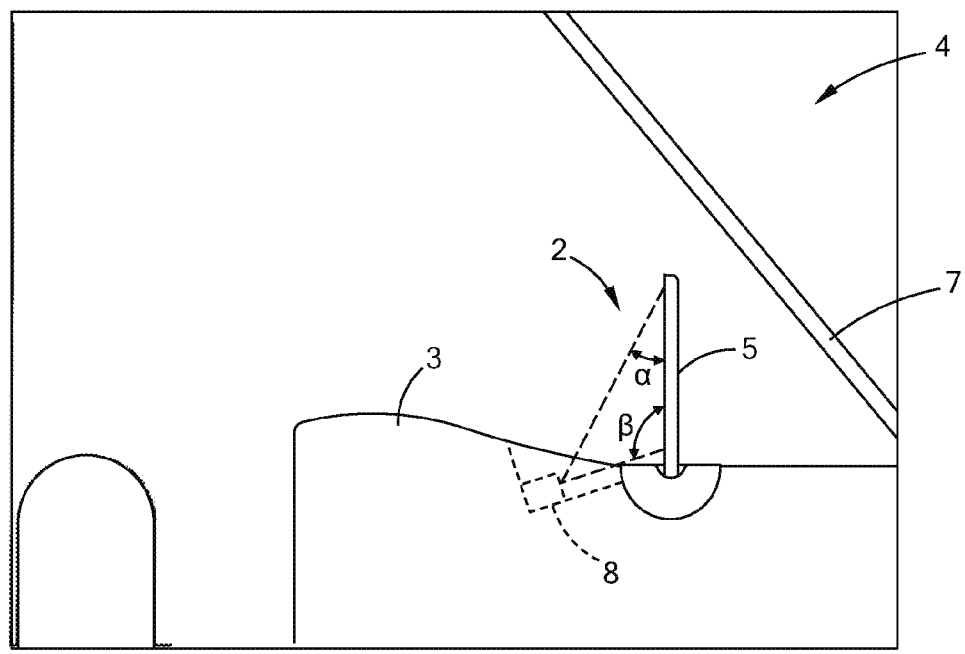
FIG. 1B is a side elevational view of the heads up display assembly of FIG. 1A.

Referring to FIGS. 1A and 1B, the reference numeral 2 generally designates a heads up display assembly of a vehicle 4 is generally shown according to one embodiment. The heads up display assembly 2 includes an electro-optic assembly 5 that is configured to receive incident light projected thereon from a projector 8 in order to display vehicle-related information. The projector 8 is positioned on a dash 3 of the vehicle 4. The electro-optic assembly 5 can be controlled to vary the amount of light transmittance based on input from a control circuit that may be located externally from the electro-optic assembly 5. For example, in daylight conditions, the electro-optic assembly 5 may be darkened to improve the contrast ratio and allow for improved visibility of information being displayed by the electro-optic assembly 5. In addition, the projector 8 may project an image onto the electro-optic assembly 5 that has the appearance of a focal point beyond the electro-optic assembly 5 and possibly beyond a windshield 7 of the vehicle 4.

Referring again to FIGS. 1A and 1B, the electro-optic assembly 5 is generally configured to deploy from a top surface of the dash 3 of the vehicle 4. In operation, the heads up display assembly 2 is activated, either manually or automatically, and elevates to an operation position. In the operation position, a portion of the electro-optic assembly 5 is still hidden below the dash 3, while a majority of the electro-optic assembly 5 extends above a top surface of the dash 3. In this position, a driver can fully view the display area of the heads up display assembly 2. When in the operation position, the projector 8 is configured to emit and project light onto the heads up display assembly 2. Notably, the projector 8 is disposed below the top surface of the dash 3. However, it will be understood that the projector 8 could extend above the top surface of the dash 3, could move between deployed and non-deployed positions with the electro-optic assembly 5, or could also be disposed at a predetermined position above the dash 3, such as in a rearview assembly or a headliner of the vehicle 4. Similarly, the electro-optic assembly 5 could be positioned elsewhere in the vehicle 4. For example, the electro-optic assembly 5 could be located at a typical position of a rearview mirror and the projector 8 could be disposed above the electro-optic assembly 5 in the headliner area or overhead console area. Further, as noted below, the electro-optic assembly 5 may display images of a side or rear of the vehicle 4.

Figure 2:
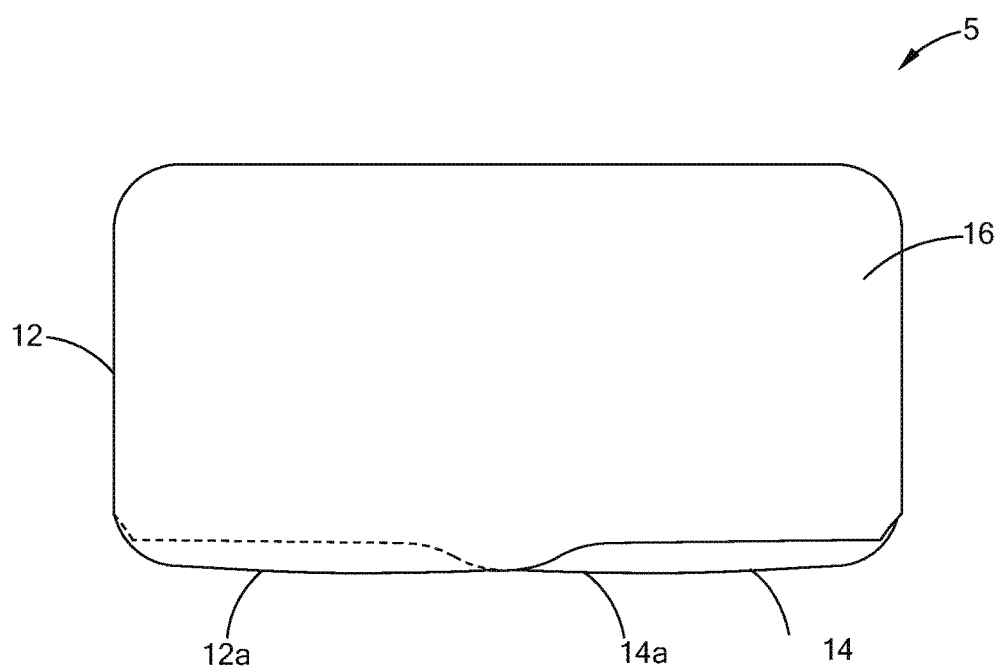
FIG. 2 is a front elevational view of one embodiment of a substrate alignment for use in an electro-optic assembly of the present disclosure.
Figure 3A:
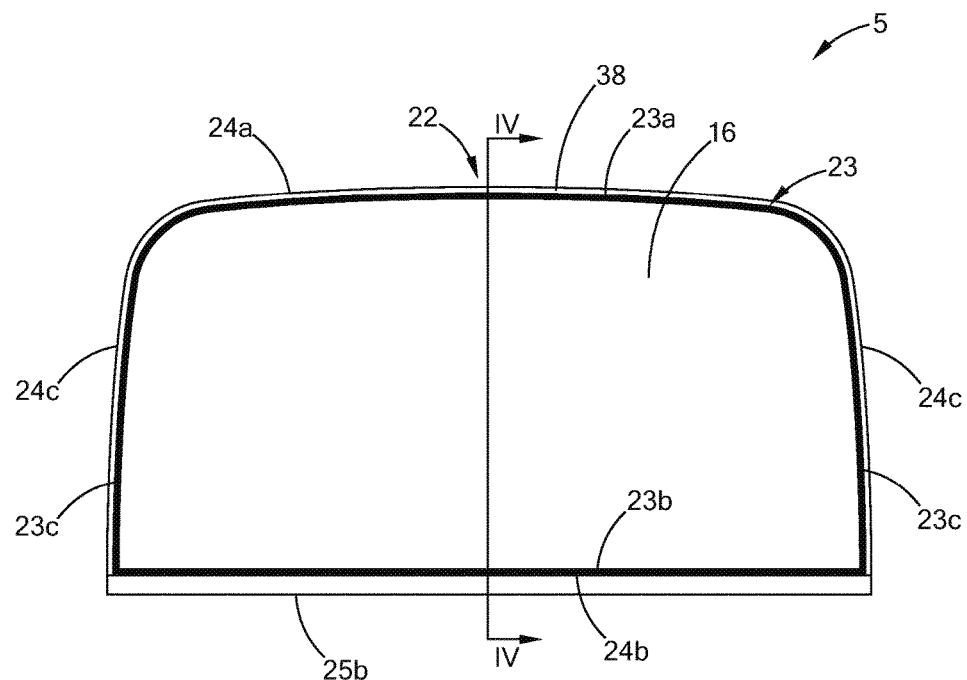
FIG. 3A is a front elevational view of one embodiment of an electro-optic assembly of the present disclosure.
Figure 3B:
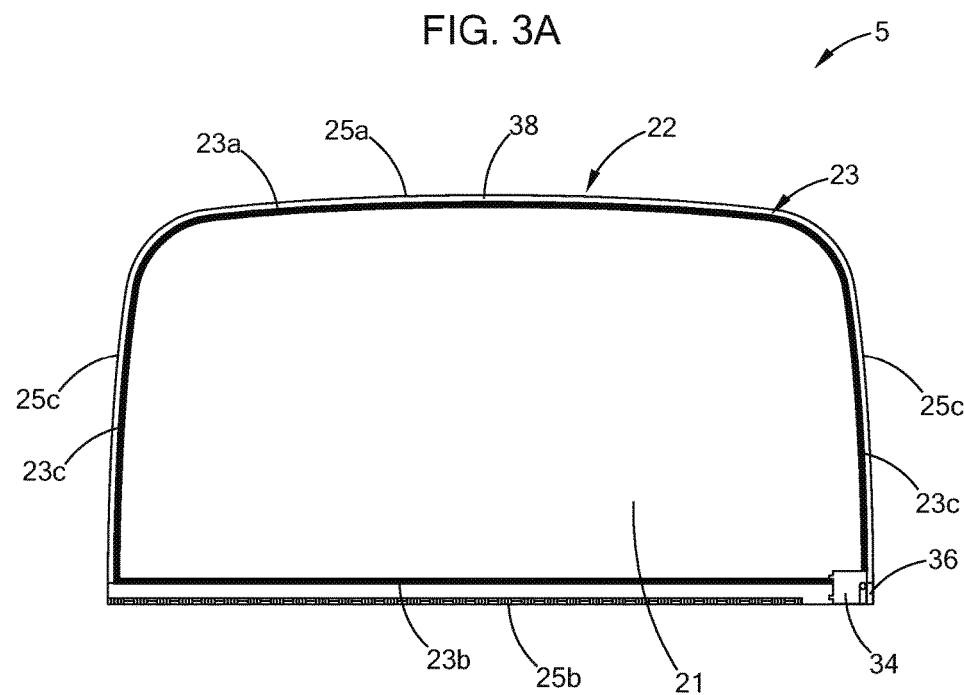
FIG. 3B is a rear elevational view of one embodiment of an electro-optic assembly of the present disclosure.
Figure 4:
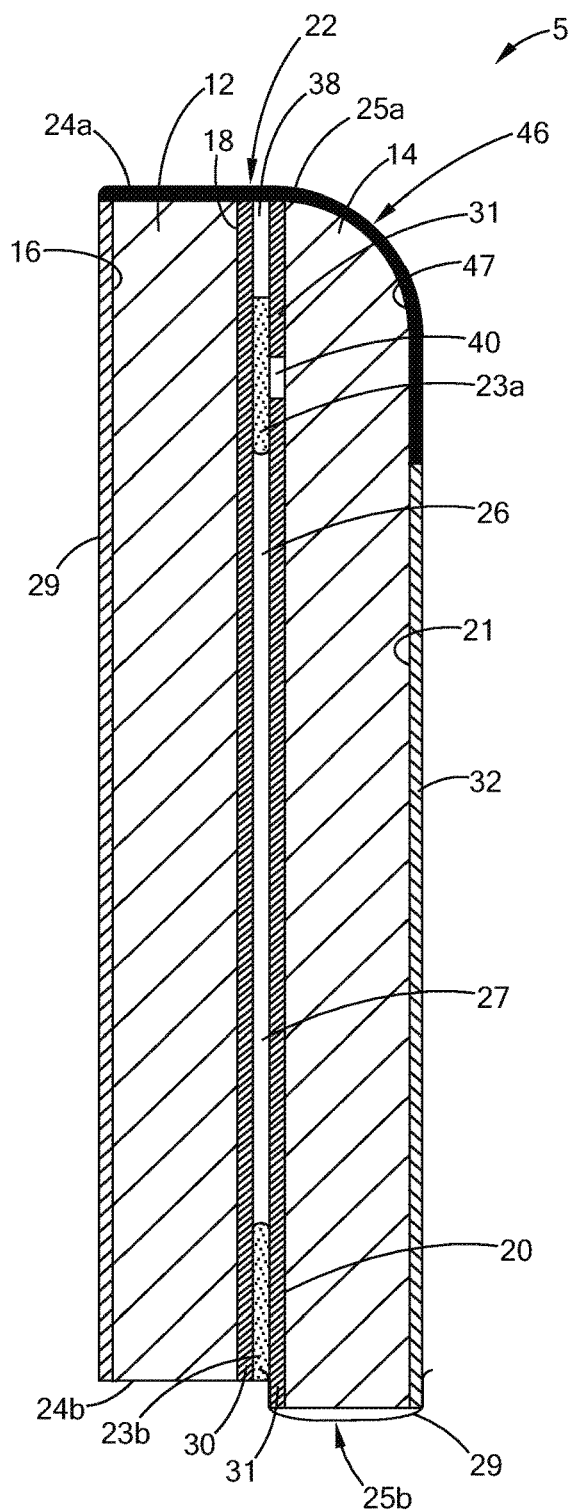
FIG. 4 is a cross-sectional view of the electro-optic assembly of FIG. 3A along line IV-IV.

Referring to FIGS. 2-4, the electro-optic assembly 5 is shown according to one embodiment. The electro-optic assembly 5 includes a first substrate 12 and a second substrate 14, each of which can be partially reflective and partially transmissive. The first substrate 12 includes a first surface 16 and a second surface 18. The second substrate 14 includes a third surface 20 and a fourth surface 21. With respect to the embodiments described herein, the first surface 16 corresponds to the surface closest to the vehicle operator whereas the fourth surface 21 corresponds to the surface farthest from the vehicle operator. The first and second substrates 12, 14 may be positioned in a parallel relationship such that the second and third surfaces 18, 20 are in close proximity. A seal 23 is disposed between the first and second substrates 12, 14 and located substantially about a periphery 22 of the electro-optic assembly 5. As shown, the seal 23 is disposed in proximity to a peripheral edge of the first and second substrates 12, 14, the peripheral edge defined by a corresponding top edge 24a, 25a, bottom edge 24b, 25b, and side edges 24c, 25c. In the illustrated embodiment, the bottom edge 25b of the second substrate 14 is slightly offset from the bottom edge 24b of the first substrate 12 whereas the top and side edges 25a, 25c of the second substrate 14 are substantially aligned with the top and side edges 24a, 24c of the first substrate 12 when viewed from the first surface 16.

As illustrated in FIG. 2, the first substrate 12 and the second substrate 14 are asymmetric, such that a left side of the first substrate 12 is taller than the second substrate 14, and a right side of the first substrate 12 is shorter than the second substrate 14. This construction allows for easy placement of contacts that are coupled with clear conductive coatings on the second and third surfaces 18, 20. A first bus clip can be added to the first substrate 12 in contact with the conductive layer on the second surface 18 at an extended region 12a. Likewise, a second bus clip can be added to the second substrate 14 in contact with the conductive layer on the third surface 20 at the recessed region 14a. In alternative embodiments, the bottom edges 24b, 25b of the first and second substrates 12, 14 may be aligned, if desired. The seal 23 includes a top portion 23a, a bottom portion 23b, and side portions 23c. The top portion 23a and the side portions 23c of the seal 23 are spaced inboard from the top edges 24a, 25a and the side edges 24c, 25c of the first and second substrates 12, 14 and the bottom portion 23b of the seal 23 is substantially level with the bottom edge 24b of the first substrate 12. An electro-optic medium 26 is located in a cavity 27 defined by the first substrate 12, the second substrate 14, and the seal 23. The electro-optic medium 26 may include any of a variety of fluids, such as those having a light transmittance that is variable with the application of an electric field that is applied between the first and second substrates 12, 14, such as, for example, electrochromic mediums.

In one embodiment, the projector 8 is disposed in the dash 3 proximate the first surface 16 of the first substrate 12 and located a distance of approximately three inches (about 7.62 cm) to four inches (about 10.16 cm) from the first surface 16 of the first substrate 12. In addition, the projector 8 is generally disposed at a position below the electro-optic assembly 5. In this instance, the angle defined by the projected light from the projector 8 and the first surface 16 of the first substrate 12 is approximately no more than 25 degrees. Notably, in this same embodiment, the angle of the projected light from the projector 8 to a bottom portion of the electro-optic assembly 5 may approach 90 degrees. In this embodiment, the light emitted from the projector 8 is projected onto the electro-optic assembly 5, and approximately 25% of the projected light is reflected back in the direction of the driver.

The first and second substrates 12, 14 may include a thickness of approximately 1.6 mm glass substrates and have an arcuate construction. More specifically, the first and second substrates 12, 14 may both be bent with a spherical radius of approximately 500 mm. Many HUD devices include a curvature and it would be understood by a person having ordinary skill in the art that the assembly as set forth herein may be curved, or may include a planar configuration. The curvature of the first and second substrates 12, 14 affects the perceived distance of the projected information. The smaller the radius, the further the information will appear to be displayed. Conversely, for a given position of the projector 8 relative to a concave reflector, the larger the radius, the shorter the perceived distance from the driver to the displayed information.

It is also to be understood that the first and second substrates 12, 14 are not limited to glass elements but may also be any other element having partially light reflective and partially light transmissive properties. Other transparent materials, including plastics, such as polycarbonate, acrylic, or cyclic olefin polymer or cyclic olefin copolymer can also be used to construct the substrates 12, 14. In another embodiment, at least the first substrate 12 is a plastic substrate. The plastic substrate may be a polymeric substrate that includes, but is not limited to, polyethylene (both low and high density), polyethylene terephthalate (PET), polyethylene naphthalate (PEN), polycarbonate (PC), acrylic polymers including, but not limited to polymethylmethacrylate (PMMA), polymethacrylates, polyamides including, but not limited to, a cycloaliphatic diamine dodecanedioic acid polymer (i.e. Trogamid® CX7323), epoxies, cyclic olefin polymers (COP) such as Zeonor 1420R, cyclic olefin copolymers (COC) such as Topas 6013S-04 or Mitsui Apel, polymethylpentene, cellulose ester based plastics like cellulose triacetate, and polyacrylonitrile. With regard to the second substrate 14, it may be a plastic substrate of the same, or a different polymeric material than the first substrate. Where both the first and second substrates 12, 14 are plastic substrates, they may be flexible or rigid substrates such that the electrochromic device formed therefrom is a flexible or rigid electrochromic device.

The first surface 16 of the first substrate 12 can include a partially light reflective and partially light transmissive coating 29 that includes a chromium/indium tin oxide (ITO)/chromium mixture. In one embodiment, the coated first surface 16 has a light transmittance between approximately 10-30% and a light reflectance between approximately 15-30%. These parameters may be obtained by application of a pre-defined anti-reflectance coating to the first surface 16. The second surface 18 of the first substrate 12 can be coated with a light transmissive and conductive coating 30 such as indium tin oxide with a sheet resistance of approximately 2 ohms/sq to 15 ohms/sq. Likewise, the third surface 20 of the second substrate 14 can also be coated with a light transmissive and conductive coating 31 such as indium tin oxide with a sheet resistance of approximately 2 ohms/sq to 15 ohms/sq. The fourth surface 21 of the second substrate 14 may be coated with an anti-reflective coating 32 that may include chromium to minimize the intensity of multiple reflections (often referred to as "double imaging") when viewing the electro-optic assembly 5 from the first surface 16. To this end, it is contemplated that the light reflectance of the fourth surface 21 can be less than 1%, desirably below 0.5%. In one embodiment, the electro-optic assembly 5 has a light reflectance of approximately 25% and light transmittance ranges from approximately 35% to below 5% when viewed from the first surface 16. In another embodiment, the electro-optic assembly 5 has a light reflectance of approximately 25% and an uncolored light transmittance of approximately 54% with a low end light transmittance below 5% in a fully darkened state when viewed from the first surface 16. The coatings, as outlined above, and the surfaces to which they are applied, have the effect of minimizing or eliminating the multiple reflections or double imaging that can occur on the heads up display assembly 2. The two main factors that contribute to double imaging are intensity and separation. Generally speaking, separation will increase as the angle from the light source to the first surface 16 becomes more acute. Consequently, if the projector 8 is below the electro-optic assembly 5, separation is greatest at a top portion of the electro-optic assembly 5. The other contributing factor, which is intensity, should not change much, if at all, from a bottom portion of the electro-optic assembly 5 to a top portion of the electro-optic assembly 5.

In assembly, the first and second substrates 12, 14 can be positioned in a parallel relationship and coupled to one another via the seal 23. In such an arrangement, the electro-optic medium 26 is surrounded by the seal 23, thereby containing the electro-optic medium 26 inside the cavity 27. According to one embodiment, the electro-optic medium 26 includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020, 987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Patent Application Publication No. 2002/0015214 A1, now U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

Referring again to FIGS. 2-4, the electro-optic assembly 5 includes a first contact and a second contact that are each wired to a control circuit. The first contact is generally illustrated as a J-clip 34 that is located near a lower right corner 36 of the fourth surface 21 as shown in FIG. 3B. The J-clip 34 is in contact with a conductive epoxy 38, such as a silver epoxy, that extends about the periphery 22 of the electro-optic assembly 5. The electro-optic assembly 5 also includes a second contact, illustrated as a bus bar or bus clip 39, that is in electrical contact with coating 31 on the third surface 20 of the second substrate 14. Alternatively, first and second bus bars may be located at a bottom portion of the first and second substrates 12, 14. In this instance, the first and second bus bars would be positioned to be in contact with the conductive coatings on the second and third surfaces 18, 20, respectively. Yet another alternative includes having first and second J-clips on opposing sides of the bottom of the electro-optic assembly 5. The first J-clip would be in contact with a conductive epoxy, such as silver epoxy, that is in electrical communication with the conductive coating on the second surface 18 of the first substrate 12, and the second J-clip would be in electrical communication with a conductive epoxy that is in contact with the conductive coating on the third surface 20 of the second substrate 14. Regardless of the nature of the electrical contacts made to the second and third surfaces 18, 20 of the first and second substrates 12, 14, respectively, the contacts will be generally hidden from view from a driver as the contacts will be disposed below the dash 3 during use. Further, in the event that J-clips are used in combination with the conductive epoxy 38 that extends about a perimeter of the electro-optic assembly 5, then a spectral filter, as set forth herein, may be used to hide or otherwise conceal the conductive epoxy 38 from view.

Figure 5:
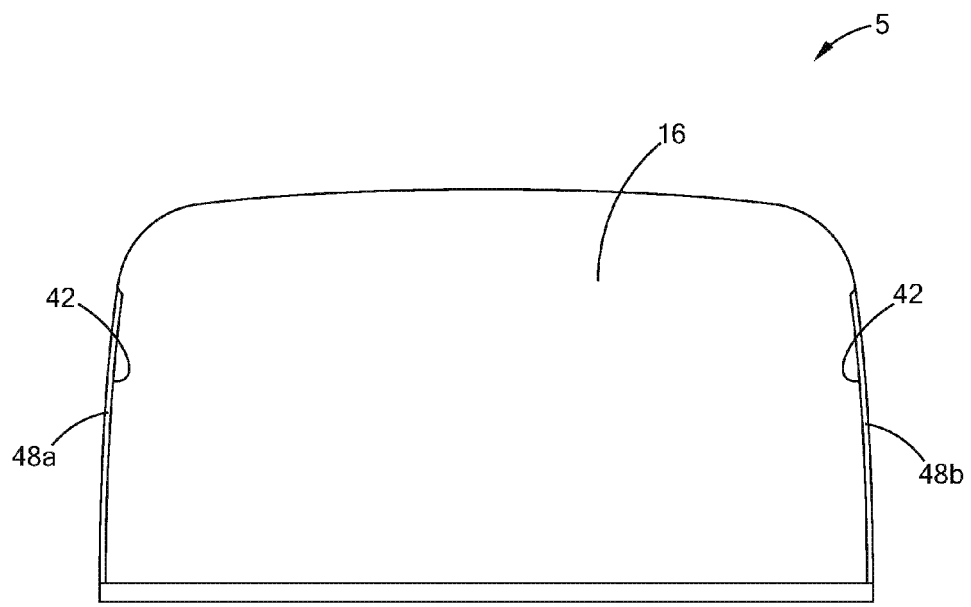
FIG. 5 is another front perspective view of the electro-optic assembly of FIG. 3A.
Figure 6:
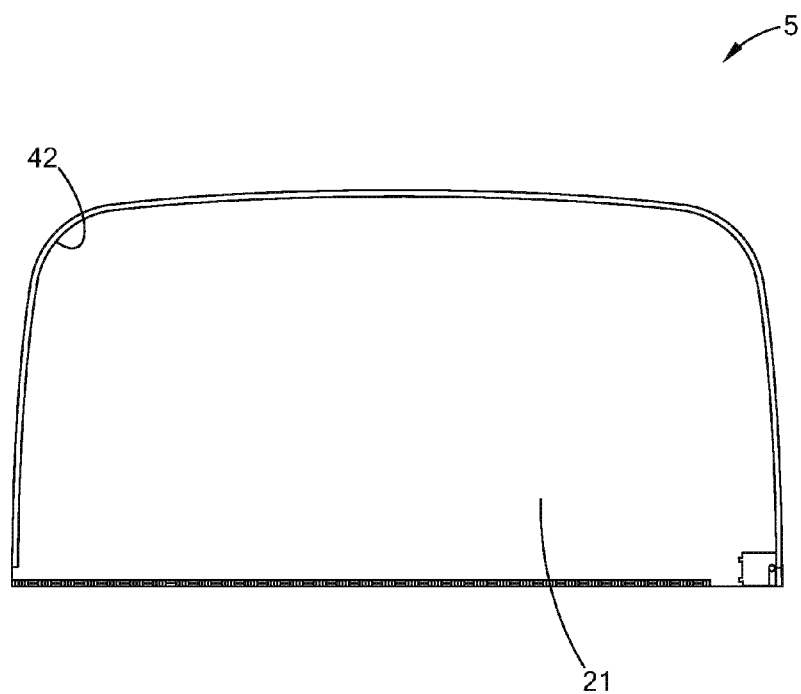
FIG. 6 is another rear perspective view of the electro-optic assembly of FIG. 3B.

As shown in FIG. 4, a portion of coating 31 located adjacent the seal 23 is removed to form a break 40 therein. The break 40 may be continuous and extend the extent of a conductive epoxy 38, thereby electrically decoupling coating 31 from the conductive epoxy 38. It is to be understood that one or more breaks may also be formed in coating 30 for electrically decoupling portions of coating 30 from the conductive epoxy 38. For purposes of illustration, break lines 42 corresponding to breaks formed in coatings 30 and 31 are exemplarily shown in FIGS. 5 and 6. With respect to the embodiment shown in FIGS. 5 and 6, the conductive epoxy 38 is completely electrically decoupled from coating 31 and is only electrically decoupled from selected portions of coating 30, represented as portions 48a and 48b in FIG. 5.

In alternative embodiments, the conductive epoxy 38 may be omitted in favor of using a bus clip located along a bottom portion of the fourth surface 21. The electro-optic assembly 5 may be configured similarly to the electro-optic assembly 5 shown in FIGS. 2-4 except that the top portion 23a and the side portions 23c of the seal 23 are positioned in the place of the conductive epoxy 38 and are level with the top edges 24a, 25a and the side edges 24c, 25c of the first and second substrates 12, 14, respectively. The coating 30 on the second surface 18 can be in electrical contact with a corresponding bus clip or other contact, and as such, it is unnecessary to form breaks in the coating 31 of the third surface 20.

In operation, the light transmittance of the electro-optic assembly 5 can be controlled by varying the potential between coatings 30 and 31, each of which function as electrodes. The light transmittance can be varied between a clear and a darkened state and control of the transmittance can be done manually or automatically. As described herein, the light transmittance may be controlled automatically based on inputs from the control circuit, which may include photo-sensors configured to detect light levels inside and/or outside of the vehicle 4. According to one embodiment, the overall light transmittance of the electro-optic assembly 5 is approximately 15-60% in a clear state and approximately 0-10% in a darkened state when viewed from the first surface 16.

With respect to the embodiments described herein, the electro-optic assembly 5 can be modified by removing material therefrom to block or obscure the view of the seal 23 and the conductive epoxy 38 (if used). For purposes of illustration, a shaped edge 46 (FIG. 4) is formed by etching or grinding the corresponding areas of the first and second substrates 12, 14. The shaped edge 46 can be formed from the top edges 24a, 25a of the first and second substrates 12, 14 and a peripheral portion 47 of the fourth surface 21. The peripheral portion 47 may be rounded, as exemplarily shown, via etching or grinding, or otherwise left planar, if desired. The shaped edge 46 may be formed on the first surface 16, the fourth surface 21, or both the first surface 16 and the fourth surface 21. The shaped edge 46 extends some length inboard along the fourth surface 21 such that the shaped edge 46 is at least partially located behind the top portion 23a of the seal 23 when the electro-optic assembly 5 is viewed from the first surface 16. The shaped edge 46 may terminate inboard past the top portion 23a of the seal 23 and may have a frosted appearance as a result of etching or grinding.

Figure 7:
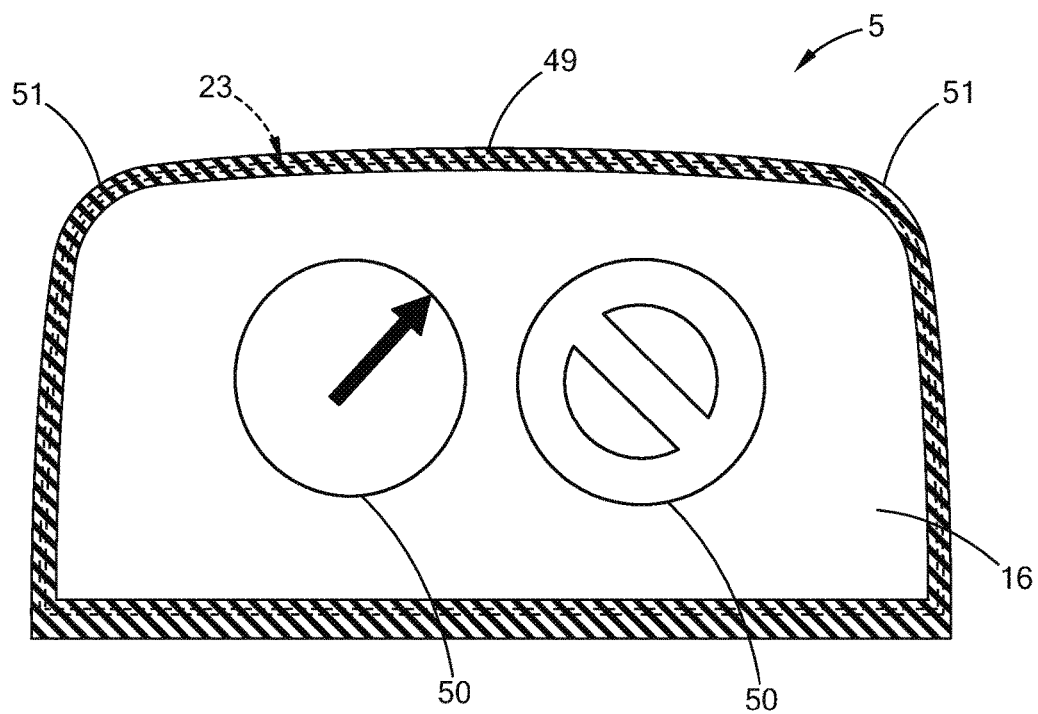
FIG. 7 is a front perspective view of the electro-optic assembly of FIG. 2 showing a peripheral concealing feature and information being displayed on the electro-optic assembly.

Alternatively, a peripheral concealing feature 49 may extend about the periphery 22 of the electro-optic assembly 5 as shown in FIG. 7. By virtue of its position relative to the seal 23 and conductive epoxy 38, the peripheral concealing feature 49 helps to obscure the seal 23 and the conductive epoxy 38 when the electro-optic assembly 5 is viewed from the first surface 16. This is especially true when the seal 23 is colorless and is clear or light scattering, in which case light scattering from the peripheral concealing feature 49 obscures the seal 23 and any small imperfections such as bubbles in the seal 23. The peripheral concealing feature 49 may be constructed by any number of methods, including the application of an additional layer, as well as etching or grinding portions of the first surface 16 to conceal the seal 23 when the electro-optic assembly 5 is viewed from the first surface 16. The peripheral concealing feature 49 may extend up to 5 mm inboard of the periphery 22 of the electro-optic assembly 5 and may correspond to an area where material has been removed or material has been added with the purpose of blocking or obstructing the view of the seal 23. In some embodiments, the peripheral concealing feature 49 may include a spectral filter material or light scattering material and can be located on any of the first, second, third or fourth surfaces 16, 18, 20, 21. In one example, the peripheral concealing feature 49 is formed by damaging both the first and fourth surfaces 16, 21 using a CO2 laser to form a frosted band approximately 4 mm wide. In another example, the peripheral concealing feature 49 is formed using a metal coating as a spectral filter on the second and third surfaces 18, 20. The spectral filter can block the view of the seal 23 and can also provide ultraviolet (UV) radiation protection for the seal 23. In another example, chromium oxynitride or other dark coating is deposited on or about the periphery 22 of the electro-optic assembly 5 to create a dark ring which acts as the spectral filter material. The spectral filter material may be selectively deposited or may be deposited over the electro-optic assembly 5 and then selectively removed to create the peripheral concealing feature 49.

In practice, the electro-optic assembly 5 can be used to display vehicle-related information such as alerts, warnings, and/or vehicle diagnostics. As an example, in FIG. 7, vehicle-related information 50 is displayed on the electro-optic assembly 5. Also, the first and second substrates 12, 14 may be configured such that the electro-optic assembly 5 has rounded edges 51, which may have a radius of curvature greater than 2.5 mm. It should be understood that some edges of the electro-optic assembly 5 may be faceted in alternative embodiments.

The electro-optic assembly 5 may be positioned and conventionally mounted to any vehicle location that is convenient for the vehicle operator to view information thereon. In some embodiments, the information may be projected toward the electro-optic assembly 5 in a manner such that the vehicle operator views the information some distance behind the electro-optic assembly 5 in a forward viewing area that may extend beyond the windshield 7 of the vehicle 4. Doing so is particularly useful when the first surface 16 is located close to the driver. Specifically, a driver who is looking out to the road is focused at a relatively far distance ahead. If information is projected to appear close to the driver (e.g., a few feet), it can be difficult for the driver to refocus his or her eyes to the nearer distance when desiring to view the information. Refocusing can be problematic for individuals who wear corrective eyewear. Information projected near to the driver may also pose problems for drivers who are near-sighted and are wearing corrective eyewear or for drivers who are far sighted and are not wearing corrective eyewear or are wearing bifocals, trifocals, or a progressive lens. It should be appreciated that the information projected onto the electro-optic assembly 5 can include an image of a side or rear vehicle scene. The image may be projected a predetermined distance behind the first surface 16 (vehicle forward) to cure potential refocusing issues.

With respect to the embodiments described herein, it is generally important to minimize the light reflectance from the second and third surfaces 18, 20. The light reflectance at these interior surfaces is a function of the refractive indices of the substrates 12, 14, the coatings 30, 31 on the second and third surfaces 18, 20, respectively, and the electro-optic medium 26. The light reflectance can also be a function of the coating thicknesses. Optical interference layers may be added to reduce the combined light reflectance from the interior surfaces and interfaces of the electro-optic assembly 5. In the case where the electro-optic assembly 5 is configured as a solution phase electrochromic device, using a fluid with a refractive index more closely matching that of the coatings 30, 31 will generally reduce the reflectance. When using indium tin oxide as the electrode, and assuming a refractive index $n_1$ of approximately 1.8 for indium tin oxide, the light reflectance normal R to the surface off of each coating/fluid interface is given by the following equation.

$$R = \left| \frac{n_1 - n_2}{n_1 + n_2} \right|^2$$

If the fluid has a refractive index $n_2$ of approximately 1.2, the light reflectance off of each coating/fluid interface can be approximately 4%. With an index fluid having a higher refractive index of 1.4, the light reflectance off of each coating/fluid surface can be approximately 1.6%. In practice, the intensity of some of the multiple reflections can be reduced by darkening the electro-optic assembly 5. Although this also reduces forward visibility, there may be times that there is a significant advantage to darkening the electro-optic assembly 5 in order to improve contrast and reduce potential double imaging. Another consideration is the light transmittance of the first surface 16. While lower light transmittance generally reduces the forward visibility, it can also reduce the double image that can be generated from the third and fourth surfaces 20, 21.

Because the electro-optic assembly 5 includes multiple surfaces, double imaging may occur if the angle of incidence is high relative to the first surface 16. When the first and second substrates 12, 14 are configured as approximately 1.6 mm glass substrates, double imaging may occur when incident light is projected at an angle greater than about 25% relative to the first surface 16. Thicker glass generally produces more double imaging whereas thinner glass generally minimizes the effect. Thus, it is generally desirable to use glass that is 1.6 mm or less for each substrate 12, 14 of the electro-optic assembly 5. It is also generally desirable that the angle of incidence is 25 degrees or less from normal. In one embodiment, incident light is projected from the projector 8 at an angle of 25 degrees or less relative to the first surface proximate a top portion of the electro-optic assembly 5. It will be understood by a person having ordinary skill in the art that the angle α at a top portion of the electro-optic assembly 5 within the display area may be 45 degrees or less, or alternatively, 25 degrees or less relative to the first surface 16. It will also be understood that the angle β at a bottom portion of the electro-optic assembly 5 within the display area may be 70 degrees or more, or alternatively, 90 degrees or more relative to the first surface 16.

Another method of minimizing double imaging includes angling the substrates 12, 14 relative to each other to compensate for any double image that is created. It is generally understood that the angle of incidence generally increases at the outer portions of the electro-optic assembly 5. One way to change the relative angle of the substrates 12, 14 is to overfill the electro-optic assembly 5 so that the center of the device expands. Another approach to changing the relative angle of the substrates 12, 14 is to use a different bend radius for each substrate 12, 14. In this instance, it is generally desirable that the rear substrate (e.g., substrate 14) has a smaller radius of curvature compared to the front substrate (e.g., substrate 12). Yet another method for minimizing double imaging is to put a main reflector on the second surface 18, thereby reducing the distance between light reflections off of the third and fourth surfaces 20, 21.

While the electro-optic assembly 5 has been described herein as a heads up display, it is also contemplated that the electro-optic assembly 5 may be configured as a suspended particle device (SPD) for use in a variety of industries, such as both the automotive and aerospace industries. For instance, SPD windows in both automotive vehicles and aircrafts may help with glare, block UV radiation, lessen cabin heat-up, and provide privacy.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A heads up display assembly comprising:
   an electro-optic assembly comprising:
      a first arcuate substrate having a first surface and a second surface, wherein one of the first surface and the second surface includes a transmissive reflective coating;
      a second arcuate substrate having a third surface and a fourth surface, wherein the fourth surface includes an anti-reflective coating;
      an electro-optic medium positioned in a cavity defined between the first substrate and the second substrate, wherein at least one of the first or second surface is configured to reflect incident light projected from a projector into a forward viewing area of a vehicle driver; and
      a spectral filter disposed about a peripheral edge of the electro-optic assembly.

2. The heads up display assembly of claim 1, wherein the first surface is coated with a partially light reflective and partially light transmissive coating, the second and third surfaces are coated with a light transmissive and conductive coating, and the fourth surface is coated with an anti-reflective coating, and wherein a light transmittance of the electro-optic assembly is controlled by varying a potential between the coatings on the second and third surfaces.

3. The heads up display assembly of claim 2, wherein said electro-optic assembly includes a light reflectance of approximately 25% and light transmittance ranges from approximately 35% to below 5%.

4. The heads up display assembly of claim 2, having a light transmittance of approximately 15-60% in a clear state and approximately 0-10% in a fully darkened state when viewed from the first surface.

5. The heads up display assembly of claim 2, wherein the coatings on the second and third surfaces include indium tin oxide with a sheet resistance of approximately 2 ohms/sq to 15 ohms/sq.

6. The heads up display assembly of claim 1, wherein each of the first and second substrates have a spherical radius of at least approximately 500 mm.

* * * * *